May 29, 1962

H. E. SCHULTZE 3,036,669

HYDRAULIC SHOCK ABSORBER WITH COMPRESSION CUT-OFF

Filed Nov. 27, 1959

INVENTOR.
Harold E. Schultze
BY
C. D. C. Staley
His Attorney

May 29, 1962 — H. E. SCHULTZE — 3,036,669
HYDRAULIC SHOCK ABSORBER WITH COMPRESSION CUT-OFF
Filed Nov. 27, 1959 — 2 Sheets-Sheet 2

INVENTOR.
Harold E. Schultze
BY
His Attorney

United States Patent Office
3,036,669
Patented May 29, 1962

3,036,669
HYDRAULIC SHOCK ABSORBER WITH COMPRESSION CUT-OFF
Harold E. Schultze, Dayton, Ohio, assignor to General Motors Corporation, Detroit, Mich., a corporation of Delaware
Filed Nov. 27, 1959, Ser. No. 855,743
2 Claims. (Cl. 188—88)

This invention relates to hydraulic shock absorbers and particularly to direct-acting type shock absorbers.

In the normal operation of hydraulic shock absorbers a valve piston operates in a cylinder to effect displacement of hydraulic fluid in opposite directions through the piston under control of the resistance valving in the piston. Also, the shock absorber is provided with a base valve in the cylinder which resists flow of hydraulic fluid from the cylinder but allows substantially free flow of fluid on return to the cylinder to and from a reservoir provided around the shock absorber cylinder.

Shock absorbers of this general type have the valving in the piston and in the base valve calibrated to take care of normal road shock conditions.

However, there are times when the vehicle on which the shock absorbers are mounted ride over an abnormal obstruction which causes high velocity movement of the shock absorber on compression stroke with the result the chassis of the vehicle strikes the bump stops provided on the vehicle for this purpose. This gives the passengers of the vehicle a severe jolt.

An objection of the invention is to provide a hydraulic shock absorber with means in the compression chamber of the shock absorber to highly restrict, and practically cut off, flow of fluid from the compression chamber during a compression stroke of abnormal extent and thereby avoid the vehicle striking the bump stops provided on the axles of the vehicle. This is accomplished by providing an auxiliary cylinder means in the compression chamber of the shock absorber that is spaced from the cylinder tube of the shock absorber, an auxiliary piston being slidable in the shock absorber cylinder and positioned between the shock absorber cylinder and the auxiliary cylinder and cooperating therewith to form an auxiliary compression chamber from which compressed fluid is allowed to escape under controlled flow through resistance passage means provided between the auxiliary piston and the auxiliary cylinder as the piston moves downwardly over the cylinder, the resistance passage means gradually closing off flow of compressed fluid from the auxiliary compression chamber to thereby gradually increase resistance to movement of the shock absorber piston and rod assembly into the shock absorber cylinder and finally substantially cut off the flow of fluid from the auxiliary compression chamber.

Further objects and advantages of the present invention will be apparent from the following description, reference being had to the accompanying drawings wherein preferred embodiments of the present invention are clearly shown.

Figure 1:
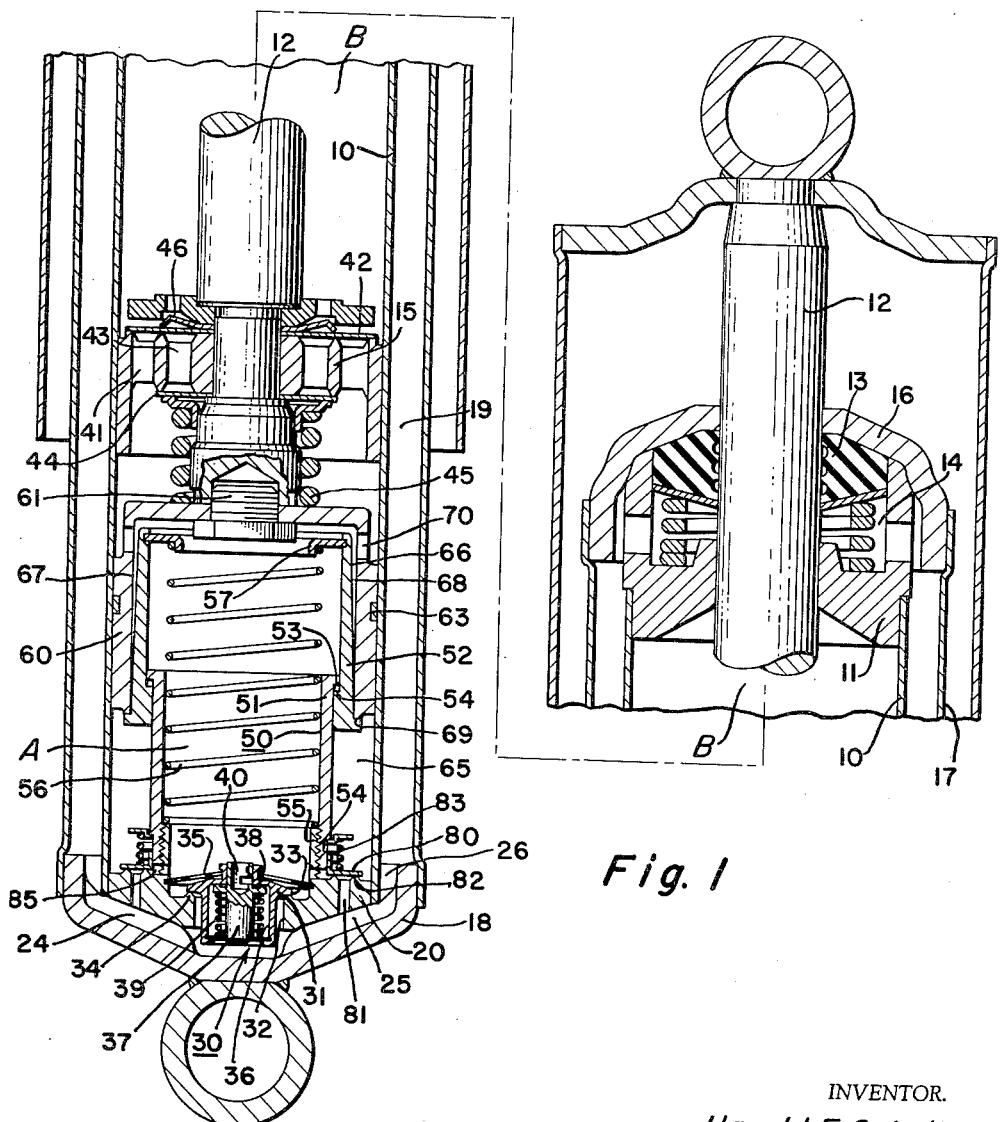
FIG. 1 is a vertical cross-sectional view of a shock absorber incorporating features of this invention.

As illustrated in FIG. 1 of the drawings the shock absorber consists of a cylinder tube 10 in which a piston 15 reciprocates. The cylinder 10 is closed at one end by a rod guide member 11 through which the actuating rod 12 extends, the rod 12 being connected with the piston 15. The rod 12 extends through a rod seal 13 that is retained in place in the seal chamber 14 by means of a closure cap 16.

The closure cap 16 carries a cylinder tube 17 spaced from the cylinder tube 10 and concentric therewith, the tube 17 being closed at its opposite end by a closure cap 18. The space between the tubes 10 and 17 forms a liquid reservoir 19.

The shock absorber piston 15 that is carried on the end of the rod 12 divides the shock absorber cylinder into a compression chamber A and a rebound chamber B, the upper end of the rod 12 normally being attached to the chassis of the vehicle while the lower end of the shock absorber is connected with the axle of the vehicle.

The lower end of the shock absorber cylinder 10 is closed by a wall structure 20 extending transversely of the cylinder tube 10 and supported on inwardly extending abutments 24 provided on the closure cap 18 to space the wall 20 from the closure cap and provide a fluid flow chamber 25 beneath the wall 20 and a flow passage 26 between the flow chamber 25 and the reservoir chamber 19.

The wall 20 supports a base valve structure 30 adapted to resist flow of hydraulic fluid from the cylinder tube 10 into the reservoir chamber 19 to allow substantially free flow of fluid from the reservoir chamber into the cylinder tube.

The valve structure 30 consists of a valve element 31 positioned within a bore 32 in the wall 20, the valve element 31 having a radially extending annular flange portion 33 that engages the valve seat 34 whereby to close the bore 32. A light finger spring 35 holds the valve element 31 on the seat 32 but provides little resistance against lifting the valve from the seat for flow of hydraulic fluid from the reservoir chamber 19 into the compression chamber A of the shock absorber.

The valve structure 30 has an axial bore 36 that receives a valve element 37 seated against the valve seat 38 by the compression spring 39, an axial opening 40 providing for flow of hydraulic fluid from the chamber A against the upper side of the valve 37 and thence into the bore 36 for flow to the fluid reservoir 19. The compression spring 39 controls the point of opening of the valve 37.

The piston 15 has a series of fluid flow passages 41 providing for flow of hydraulic fluid from the compression chamber A to the rebound chamber B under control of the valve 42. The piston 15 has a second series of fluid flow passages 43 providing for flow of hydraulic fluid from the rebound chamber B to the compression chamber A under control of the valve 44. A compression spring 45 controls the opening point of the valve 44 while a finger spring 46 controls the opening point of the valve 42.

The shock absorber thus far described will function in a substantially normal manner wherein movement of the piston 15 toward the base valve 30 will place fluid under compression in the chamber A on the compression stroke, excess fluid that is not displaced into the rebound chamber B through the valve 42 being discharged under pressure through the base valve 30 under control of the valve element 37, the volume of fluid flow through the base valve 30 being equivalent to the displacement of rod 12 that enters the rebound chamber B. On the return stroke or rebound stroke, fluid will flow from the rebound chamber B into the compression chamber A under control of the valve 44. Make-up fluid to fill the chamber A on movement of the piston 15 away from the base valve 30 will be received from the reservoir 19 through the bore 32 of the wall 20, valve element 31 opening against the light finger spring 35 for this purpose.

The shock absorber thus far described has no additional provision for restricting movement of the piston 15 into the cylinder 10 other than the normal valve action of the valves on the piston 15 and the valve in the base valve 30. Thus, when a severe compression stroke is encountered, the chassis of the vehicle can strike the bump stops on the axle of the vehicle.

To eliminate this condition, an additional means is provided for increasing the resistance to movement of the rod 12 and piston 15 into the compression chamber of the shock absorber. The means providing the additional resistance comprises auxiliary cylinder means 50 that includes a primary cylinder 51 and a secondary cylinder 52 that is slidable upon the cylinder 51. Cylinders 51 and 52 have cooperating shoulders 53 and 54 respectively that limit the extension of the secondary cylinder 52 above the primary cylinder 51.

The primary cylinder 51 is secured to the wall 20 by a threaded portion 54 at the lower end thereof mating with a threaded portion 55 that extends upwardly from the base 20. A compression spring 56 urges the secondary cylinder 52 to its position of extension relative to the primary cylinder 51, the spring 51 engaging a spring retainer 57 secured to the upper end of the secondary cylinder 52 as shown in the drawing. An auxiliary piston 60 is attached to the lower end of the rod 12 that carries the main shock absorber piston 15, a threaded retainer 61 securing the piston 60 to the lower end of the rod 12.

The auxiliary piston 60 slidably engages the cylinder tube 10 and is provided with a piston ring 63 to prevent loss of fluid pressure between the auxiliary piston and the cylinder tube.

The auxiliary cylinder means 50, consisting of the primary cylinder 51 and the secondary cylinder 52 together with the auxiliary piston 60, the lower end of the cylinder tube 10 and the wall 20 form an auxiliary compression chamber 65 in the lower end of the main compression chamber A.

The secondary cylinder 52 has its outer peripheral wall 66 tapered in the form of a vertically positioned truncated cone.

The inner peripheral wall 67 of the auxiliary piston 60 is cylindrical so that when the auxiliary piston 60 moves downwardly over the secondary piston 52, the clearance space 68 between the piston 60 and the secondary cylinder 52 forms a resistance passage against flow of fluid from the auxiliary compression chamber 65. As the piston 60 moves downwardy, the resistance passage 68 is gradually decreased in size to increase the resistance to flow of fluid from the auxiliary compression chamber 65 until the piston 60 reaches the bottom end of its stroke at which it engages a shoulder 69 on the secondary cylinder 52 and substantially closes off flow of hydraulic fluid from the auxiliary compression chamber 65. Then as the piston 60 continues to move downwardly on the compression stroke, the piston 60 and the secondary cylinder 52 will move downwardly as a unit into auxiliary compression chamber 65 to highly compress the fluid and produce a very high resistance against movement of the rod 12 toward the bottom wall 18 of the shock absorber.

The auxiliary piston 60 has one or more ports or passages 70 providing for flow of hydraulic fluid between the compression chamber portion that is between the auxiliary piston 60 and the piston 15 of the shock absorber and the portion of the compression chamber A that is within the auxiliary cylinder means 50 as formed by the primary and secondary cylinders thereof. Thus hydraulic fluid can flow from the chamber B of the shock absorber through the chamber A and thence through the base valve 30 on the compression stroke of the shock absorber as well as during the rebound stroke.

The auxiliary piston 60 is illustrated in the drawing in a position substantially midway of the compression stroke of the shock absorber wherein the bottom end of the piston 60 has engaged the shoulder 69 on the secondary cylinder 52.

Since hydraulic fluid is exhausted from the auxiliary compression chamber 65 on a compression stroke of the shock absorber, the exhaust of fluid will need to be replaced into the compression chamber 65. This is taken care of by the valve 80 that normally closes a port 81 connecting the auxiliary compression chamber 65 with the chamber 25 below the wall 20, and thereby with the reservoir 19. This valve 80 is normally positioned upon the valve seat 82 by the compression spring 83. Thus the valve 80 is a one-way check valve that prevents any flow of hydraulic fluid from the compression chamber 65 on movement of the auxiliary piston 60 and the secondary cylinders 52 into the compression chamber 65, but allows substantially unrestricted flow of hydraulic fluid from the reservoir chamber 19 into the auxiliary compression chamber 65 on upward movement of the piston 60 and the secondary cylinders 52.

A port 85 is provided in the wall portion 55 adjacent the seat 82 of the valve 80 so that the valve 80 and its sliding engagement with the primary cylinder 51 provides a valve that closes the port 85 against flow of hydraulic fluid from the auxiliary compression chamber 65 into the main compression chamber A during the compression stroke of the shock absorbers. However, on return or rebound stroke, the port 85 will be opened when valve 80 lifts from its seat 82 to provide interconnection between auxiliary compression chamber 65 and the main compression chamber A for balance of pressures in these chambers.

Figure 2:
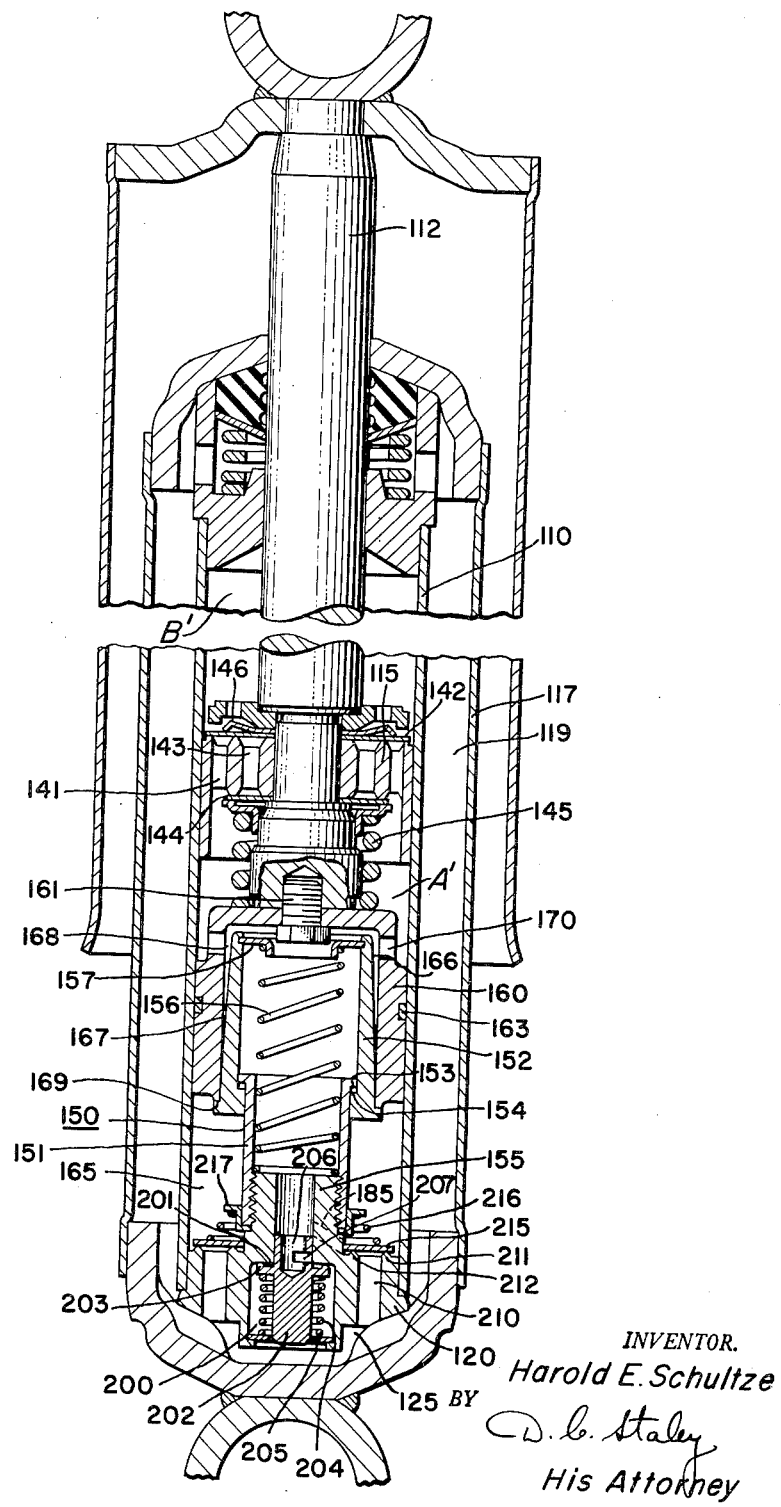
FIG 2 is a vertical cross-sectional view similar to FIG. 1 illustrating a modified arrangement of the shock absorber.

In FIG. 2 there is illustrated a modified arrangement of the shock absorber, particularly in regard to the valving arrangement for the main compression chamber A and the auxiliary compression chamber 65 of the device illustrated in FIG. 1. Other than for the modified arrangement of the valving in the closure wall 20 of the device of FIG. 1, the remaining parts of the shock absorber are substantially the same as those illustrated in FIG. 1, except for dimensional sizes.

In the device of FIG. 2 the shock absorber consists of the cylinder tube 110 that receives the main shock absorber piston 115 that is of the same type and construction as that illustrated in FIG. 1. The piston 115 has a plurality of passages 141 controlled by the valve 142 and a plurality of passages 143 controlled by the valve 144 which provide control of flow of hydraulic fluid between the main compression chamber A' and the rebound chamber B' in the same manner as that of the shock absorber disclosed in FIG. 1.

The device of FIG. 2 also includes an auxiliary cylinder 150 that is composed of the primary cylinder 151 and the secondary cylinder 152 that correspond to the cylinders 51 and 52 respectively of the device of FIG. 1. The secondary cylinder 152 is urged upwardly relative to the primary cylinder 151 by means of the compression spring 156.

An auxiliary piston 160 is secured to the lower end of the actuating rod 112, the piston 160 being comparable to the piston 60 of the device of FIG. 1. This piston has one or more openings 170 providing for communication between the chamber between the auxiliary piston 160 and the main shock absorber piston 115 and the chamber that is internal of the auxiliary cylinder 150. The piston 160 also has a piston ring 163 comparable to the piston ring 63 of the device of FIG. 1.

The outer periphery 166 of the secondary cylinder 152 is tapered in the form of a vertically disposed truncated cone thereby providing a resistance space 168 between the secondary cylinder and the auxiliary piston in the same manner as that provided in the device of FIG. 1.

The secondary cylinder 152 and the auxiliary piston 160 are movable together into the auxiliary compression chamber 165 for compression of fluid therein in the same manner as heretofore described with reference to the device of FIG. 1.

A closure wall 120, comparable to the closure wall 20 of FIG. 1, closes the lower end of the cylinder tube 10 and has an upwardly projecting portion 155 that threadedly receives the lower end of the primary cylinder 151 to secure the same on the closure wall 120. The closure wall 120 has an axial chamber 200 provided with a radial wall 201 that forms a valve seat for a valve element 202 having the seat portion 203 engaging the valve seat 201. The valve element 202 is normally retained in seated engagement with the wall 201 by a compression spring 204 that has its lower end engaging a spring retaining member 205. The valve element 202 is provided with an axial opening 206 from which there extends a radial opening 207 through which hydraulic fluid will flow when the valve element is unseated from its seat 201 so that fluid can pass into the chamber 200 and thence into the passage 125 for delivery into the fluid reservoir 119 provided between the cylinder tube 110 and the outer tube 117.

The closure wall 120 is also provided with a plurality of axially extending passages 210 disposed peripherally around the wall 120, circularly arranged valve seats 211 and 212 being provided around the ports 210 to receive a valve element 215 held on the valve seats by a compression spring 216 that has its upper end engaging a spring retaining member 217.

In a compression stroke of the shock absorber of FIG. 2, that is on movement of the piston 115 toward the closure wall 120, hydraulic fluid from the compression chamber A' will flow into the rebound chamber B' under control of the resistance valve 142. Excess fluid created by entry of the actuating rod 12, that is the volume of the fluid displaced by the rod 112, will pass downwardly through the port 170 and internally of the auxiliary cylinder 150 to create pressure within the compression chamber A' and internally of the auxiliary cylinder 150 until the valve element 202 is moved against the force effect of the spring 204 to lift the valve from its seat 201 so that the excess fluid will flow through the passages 206 and 207 in the valve 202 and thence into the chamber 200 and pass into the fluid reservoir 119 by way of the passage 125.

However, while this is occurring, the auxiliary piston 160 is moving downwardly over the secondary cylinder 152 tending to trap hydraulic fluid in the auxiliary compression chamber 165 which can escape only through the resistance passage 168. Thus, as the auxiliary piston 160 moves downwardly, resistance to downward movement of this piston is increased by the increasing of the resistance of passage 168 until the piston 160 reaches the position illustrated in FIG. 2 at which time the passage 168 is substantially closed against further flow of hydraulic fluid from the auxiliary compression chamber 165. The pressure in the chamber 165 retains the valve 215 on its seat so that further downward movement of the auxiliary piston 160 and the secondary cylinder 152 together produce a high hydraulic pressure in the chamber 165, which effectively hydraulically cushions further movement of the shock absorber piston 115 toward the closure wall 120 and thereby prevents the chassis of the vehicle from striking the bump stops on the vehicle.

On rebound movement of the shock absorber, that is on movement of the piston 115 away from the closure wall 120, hydraulic fluid must pass from the rebound chamber B' into the compression chamber A' under control of the resistance valve 144 in the piston 115. This hydraulic fluid must pass from a portion of the compression chamber A' between the auxiliary piston 160 and the shock absorber piston 115 through the passages 170 into the internal volume of the auxiliary cylinder 150, this being the only communication between the respective areas. Obviously, at this time the volume of the chamber 165 is not available for receiving hydraulic fluid from the compression chamber A' except by way of the resistance passage 168, which, when the auxiliary piston 160 and the secondary cylinder 152 are in the positions shown in the drawing is substantially closed off. Since the volume of fluid being displaced from the rebound chamber B' into the compression chamber A' is substantially greater than the internal volume of the auxiliary cylinder 150, the excess fluid creates pressure internally of the auxiliary cylinder 150 to open the valve element 202 to allow the excess fluid to pass into the passage 125 and thence either into the reservoir 119 or through passage 210 into the auxiliary compression chamber 165, the volume of which is being increased by the upward movement of the auxiliary piston 160. At this time the aforementioned pressure within the internal volume of the auxilary cylinder 150 will retain the secondary cylinder cylinder 152 in its downward position so that the auxiliary piston 160 will move upwardly by itself until such time as the pressure within the compression chamber A' falls below the rate of the spring 156, whereafter the secondary cylinder 152 will move upwardly.

In the aforementioned operation, it will therefore be seen that in the rebound stroke of the shock absorber the resistance valve 144 in the shock absorber piston 115 works in series with the valve element 202 in the closure wall 120.

However, there may be times when it is not desirable to have the valves 144 and 202 operate in series. Under this circumstance a by-pass port 185, comparable to the ports 85 of the device illustrated in FIG. 1, can be provided between the internal volume of the auxiliary cylinder 150 and the auxiliary compression chamber 165, the valve 215 of the device of FIG. 2 then being formed in the manner of valve 80 of the device of FIG. 1 so that the port 185 would normally be closed in the same manner as closure of the ports 85 of the device of FIG. 1. With this port 185 being provided in the device of FIG. 2, on the rebound stroke of the shock absorber the excess fluid displaced from the rebound chamber B' into the compression chamber A' can pass directly into the auxiliary compression chamber 165 without opening the valve element 202, the valve element 202 thereby being effectively by-passed during the rebound stroke of the shock absorber.

While the embodiments of the present invention as herein disclosed constitute a preferred form, it is to be understood that other forms might be adopted.

What is claimed is as follows:

1. In a hydraulic shock absorber, first cylinder means having first wall means at one end thereof closing the said end of said cylinder means, second wall means closing the opposite end of said first cylinder, piston means reciprocable in said first cylinder means dividing the first cylinder into a compression chamber and a rebound chamber and including rod means extending through said rebound chamber and said first wall means to the exterior of the shock absorber, said first piston means having valve means controlling flow of fluid through said first piston means in opposite directions of flow on opposite reciprocal movement of the piston means in said first cylinder means, auxiliary cylinder means in the compression chamber of said first cylinder means extending longitudinally thereof from said second wall means for a part of the length of the said compression chamber, auxiliary piston means between said first cylinder means and said auxiliary cylinder means movable with said first piston means and cooperating with both said cylinder means and said second wall means to form therewith auxiliary compression chamber means, clearance space between said auxiliary piston and said auxiliary cylinder means forming resistance passage means for fluid flow from said auxiliary compression chamber to said first-mentioned compression chamber, fluid reservoir means receiving fluid from said compression chambers and from which fluid is returned to said compression chambers, first valved passage means between said first-mentioned compression chamber and said reservoir means providing for restricted flow of fluid from said first-mentioned compression chamber to said reservoir and substantially unrestricted return flow, second valved passage means between said auxiliary compression chamber and said reservoir means preventing flow of fluid from said auxiliary compression chamber on movement of the auxiliary piston means into said auxiliary compression chamber and substantially unrestricted return flow into said auxiliary compression chamber on reverse movement of the auxiuliary piston means, movement of said auxiliary piston means into said auxiliary compression chamber means effecting compression of fluid therein with controlled restricted release of the fluid under compression therein through said resistance passage means, and additional valved passage means between said first-mentioned compression chamber and said auxiliary compression chamber open during the period of unrestricted return flow through said second valved passage means providing for pressure balance between said compression chambers during the said period, said second valved passage means and said additional valved passage means being served by the same valve means to open and close the same concurrently.

2. In a hydraulic shock absorber, first cylinder means having first wall means at one end thereof closing the said end of said cylinder means, second wall means closing the opposite end of said first cylinder, piston means reciprocable in said first cylinder means dividing the first cylinder into a compression chamber and a rebound chamber and including rod means extending through said rebound chamber and said first wall means to the exterior of the shock absorber, said first piston means having valve means controlling flow of fluid through said first piston means in opposite directions of flow on opposite reciprocal movement of the piston means in said first cylinder means, auxiliary cylinder means in the compression chamber of said first cylinder means extending longitudinally thereof for a part of the length of said compression chamber, said auxiliary cylinder means comprising a fixed primray cylinder and a secondary cylinder movable on said primary cylinder having an end thereof extensible beyond one end of said primary cylinder, spring means between said primary and secondary cylinders positioning said secondary cylinder with said end thereof beyond said primary cylinder, auxiliary piston means slidable in said first cylinder means and positioned below said first piston means and movable with said first piston means and positioned between said secondary cylinder of said auxiliary cylinder means and said first cylinder means for movement in the space therebetween and cooperating with said first cylinder means and said auxiliary cylinder means and said second wall means to form therewith auxiliary compression chamber means, clearance space between said auxiliary piston and said secondary cylinder of said auxiliary cylinder means forming resistance passage means for fluid flow from said auxiliary compression chamber to said first-mentioned compression chamber, fluid reservoir means receiving fluid from both said compression chambers and from which fluid is returned to both said compression chambers, first valved passage means in said second wall means providing for restricted flow of fluid from said first-mentioned compression chamber to said reservoir and substantially unrestricted return flow, second valved passage means in said second wall means preventing flow of fluid from the auxiliary compression chamber to said reservoir on movement of the auxiliary piston means into said auxiliary compression chamber and substantially unrestricted return flow from said reservoir into said auxiliary compression chamber on reverse movement of the auxiliary piston means, movement of said auxiliary piston means into said auxiliary compression chamber means effecting compression of fluid therein with controlled restricted release of the fluid under compression in the auxiliary compression chamber through said resistance passage means and passage means in said primary cylinder of said auxiliary means between said auxiliary compression chamber and the interior of the primary cylinder and wherein the valve means for said second valved passage means in said second wall means closes the aforementioned passage means during movement of said auxiliary piston into said auxiliary compression chamber and opens the aforementioned passage means during reverse movement of said auxiliary piston means.

References Cited in the file of this patent

UNITED STATES PATENTS

| | | |
|---|---|---|
| 2,343,478 | Rossman | Mar. 7, 1944 |
| 2,606,630 | Rossman | Aug. 12, 1952 |
| 2,783,859 | Patriguin | Mar. 5, 1957 |
| 2,907,414 | Patriguin | Oct. 6, 1959 |

FOREIGN PATENTS

| | | |
|---|---|---|
| 1,169,663 | France | Sept. 15, 1958 |